Jan. 15, 1946. M. L. SMITH 2,393,003
KIDNEY CATHETER
Filed May 3, 1944
Fig. I
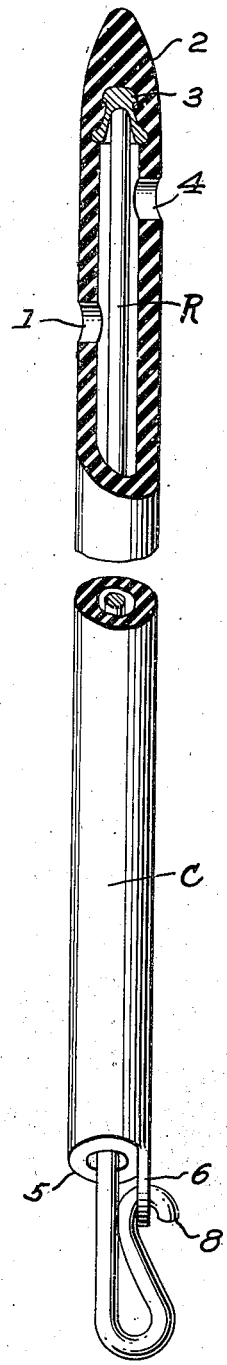
Fig. II
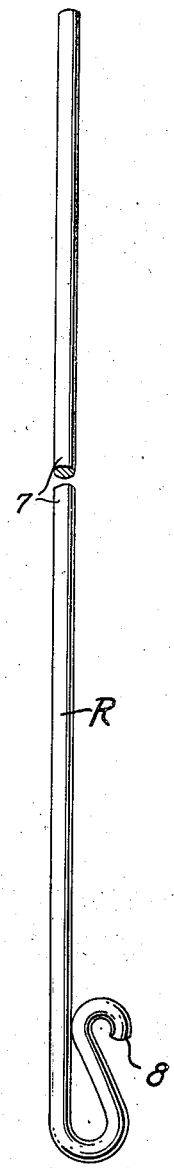
Fig. III
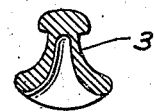
Fig. IV
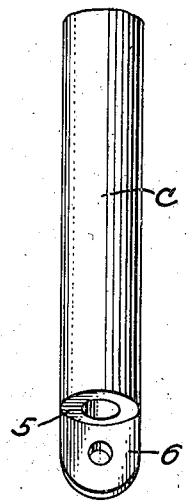
Inventor
Minton Larkin Smith Patented Jan. 15, 1946

2,393,003

UNITED STATES PATENT OFFICE 2,393,003

KIDNEY CATHETER

Minton Larkin Smith, Savannah, Ga.

Application May 3, 1944, Serial No. 533,840½

4 Claims. (Cl. 128—349)

My invention relates to new improvements in kidney catheters. The object is to make possible the general use of a catheter constructed of rubber or other soft pliable composition. I say this because it is impossible to put a soft rubber catheter up through the ureter tract without using a wire or something similar, then there is always the chance of the wire sticking through the soft rubber catheter and injuring the patient, to prevent this it is customary to solder a lump or tit on the end of the wire. Very often when the doctor attempts to pull the wire out the lump or tit on the wire wire dislodges the catheter. This I believe is why the rubber catheter is not in general use today. The fiber catheter is generally used today and it is inferior in every way to the rubber catheter, with the exception that it is stiff enough to be put up to the kidney without the use of a wire or anything similar. My invention makes it possible to stretch the rubber catheter making the circumference smaller, therefore making it easier to put it up to the kidney. My invention is illustrated in the accompanying drawing forming a part of this application.

Fig. 1 is a longitudinal sectional view of the catheter with the flexible rod in place.

Fig. 2 is a longitudinal view of the flexible rod having a hook on the handle serving as a means for holding the catheter in a stretched position.

Fig. 3 is a longitudinal sectional view of the hollow button or nipple serving as a means of preventing the rod from sticking into the tip end of the catheter.

Fig. 4 is a longitudinal view of the inner end of the catheter showing the tongue with a hole in it serving as a means of fastening the catheter to the rod.

The reference numeral 1 indicates a small aperture in the catheter C for draining the kidney of urine or any solution that may be injected into it.

The tip or head 2 of the catheter is constructed of soft rubber or any similar material, and is pointed so it can be more easily inserted.

A button or nipple 3 made of metal or any suitable material is placed in the outer end of the bore of the catheter C to prevent the rod R from sticking into the catheter. Button 3 is preferably built into the catheter C and stays there permanently.

Another aperture 4 is provided in the wall of the catheter for draining the kidney.

The end 5 of catheter C is open, and the urine, etc., drains out through same.

A tongue 6 is formed on the end 5 of the catheter C and has a hole in it, its purpose being to receive a hook 8 the rod R which holds the catheter C stretched while being inserted in the kidney.

A flexible rod 7 is provided, made of metal or any suitable material, its purpose being to lend the necessary stiffness to the catheter to enable the urologist to direct the catheter up into the kidney, and the hook 8 is made on the handle of the rod, its purpose being to hook and hold the catheter in a stretched condition.

I claim:

1. A kidney catheter comprising a tube of flexible resilient material having a pointed closed tip and having openings in its side wall adjacent the tip; a rigid member in the closed end of the tube; a stiffening rod extending into the tube and having its inner end engaging the rigid member and having its outer end extending beyond the adjacent end of the tube and bent to form a handle having a hook; and a tab on the adjacent end of the tube having a hole receiving the said hook when the tube is elongated to maintain the same stretched.

2. In a catheter as set forth in claim 1, said rigid member having a funnel-shaped recess in its exposed face receiving the end of the rod, and having a knob on the other face moulded into the material of the tube.

3. A kidney catheter comprising a tube of flexible resilient material having a pointed closed tip and having openings in its side wall adjacent the tip; a rigid button permanently secured in the closed end of the tube having a central recess; a stiffening rod extending into the tube and having its inner end engaging the recess of the button and having its outer end extending beyond the adjacent end of the tube and bent to form a handle having a hook; and a tab on the adjacent end of the tube having a hole receiving the said hook when the tube is elongated to maintain the same stretched.

4. In a catheter as set forth in claim 3, said recess in the button being funnel-shaped; and said button having a knob on the inner face moulded into the material of the tube.

MINTON LARKIN SMITH.